June 27, 1967 W. R. HEWLETT 3,328,685
OHMMETER UTILIZING FIELD-EFFECT TRANSISTOR AS
A CONSTANT CURRENT SOURCE
Filed April 7, 1964
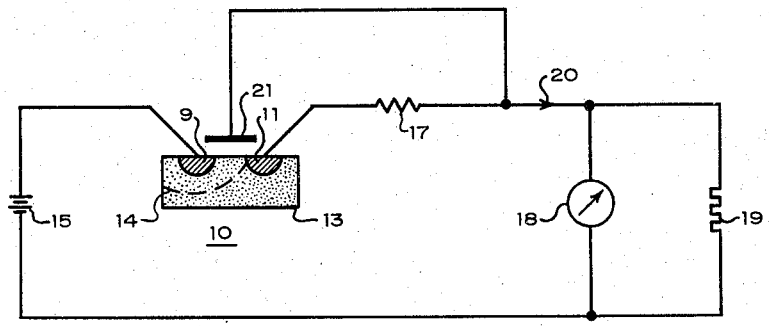
INVENTOR
WILLIAM R. HEWLETT
BY R. C. Smith
ATTORNEY

United States Patent Office 3,328,685
Patented June 27, 1967

3,328,685
OHMMETER UTILIZING FIELD - EFFECT TRANSISTOR AS A CONSTANT CURRENT SOURCE
William R. Hewlett, Palo Alto, Calif., assignor to Hewlett-Packard Company, Palo Alto, Calif., a corporation of California
Filed Apr. 7, 1964, Ser. No. 357,923
1 Claim. (Cl. 324—62)

This invention relates to a circuit for linearizing the meter scale of an ohmmeter.

It is a principal object of the present invention to provide a compensating network for an ohmmeter which linearizes the meter indication over substantially the entire resistance-measurement range.

It is another object of the present invention to provide an ohmmeter circuit including a field-effect transistor which provides a linear relationship between measured resistance and meter deflection over substantially the entire operating range.

Other and incidental objects of the present invention will be apparent from a reading of this specification and an inspection of the accompanying drawing which shows a schematic diagram of the ohmmeter of the present invention.

In the drawing, the surface electrodes 9 and 11 of a field-effect transistor 10 are connected respectively to one terminal of a source 15 of unidirectional voltage and to one terminal of resistor 17. The remaining terminals of the source 15 and resistor 17 are connected to the indicating meter 18 which is connected in shunt with the resistor 19 under test. The control electrode 21 of field-effect transistor 10 is also connected to the remaining terminal of resistor 17.

The surface electrodes 9 and 11 are typically regions of n-type conductivity material in a body 13 of p-type conductivity material. Positive voltage applied to electrode 9 reverse biases the junction formed between electrode 9 and the body 13 and creates a space charge region within boundary 14 about this junction in the general shape of the surface electrode 9. The bias on this junction is sufficiently high to extend the space charge region across the space between the two electrodes 9 and 11. The p-n junction formed by the body 13 and the n-type material of electrode 11 then emits charge carriers (electrons in this case) into the space charge region within boundary 14. These carriers are collected by the p-n junction formed by the body 13 and electrode 9 and a resulting current 20 flows in the external circuit.

The electron flow in the space charge region about electrode 9 is due largely to the electric field between the two electrodes 9 and 11 operating at different potentials. A gate electrode 21 which is insulated from the body 13 and from the surface electrodes 9 and 11 is so disposed near the space between the electrodes 9 and 11 as to produce an electric field in the space charge region about electrode 9 in response to voltage applied to the gate electrode 21. The stream of electrons from electrode 11 to electrode 9 is thus opposed or retarded by the electric field produced by application to the gate electrode 21 of a voltage which is negative with respect to electrode 11. Conversely, the electrons leaving electrode 11 are accelerated by a positive voltage applied to the gate electrode 21 with respect to electrode 11. This electron stream and the resulting external circuit current 20 may thus be maintained constant by connecting gate electrode 21 to receive the voltage drop across resistor 17 with respect to the surface electrode 11. The current 20 in the external circuit including the resistor 19 under test thus remains substantially constant over a wide range of values of resistor 19 under test. The meter 18, having an input resistance which is very large compared with the largest value of resistor 19, responds to the voltage drop across the resistor under test and thereby provides a direct indication of its resistance. Since the circuit current 20 is maintained constant by the field-effect transistor 10, a linear relationship is maintained between the deflection of meter 18 and the resistance of resistor 19 under test over a wide range of values.

I claim:

A circuit for measuring the resistance of an element under test, the circuit comprising:
 a field-effect transistor having a body portion of one conductivity type and having first and second spaced surface electrodes of opposite conductivity disposed to form first and second spaced p–n junctions with said body portion;
 a third electrode of said transistor disposed near the first and second electrodes and the space therebetween;
 said third electrode being insulated from said first and second electrodes and from said body portion;
 a source of unidirectional voltage and a resistor;
 a series circuit including said resistor, the element under test and said source of unidirectional voltages and having end terminals connected to said first and second electrodes;
 said series circuit forward biasing the first p–n junction and reverse biasing the second p–n junction sufficiently to extend the space charge region thereabout across the space between the first and second electrodes;
 means connected to said resistor for applying the signal thereacross to said third electrode with sufficient amplitude and polarity to establish an electric field in said space charge region to oppose current flow therethrough; and
 means connected to said element under test for providing an indication of the signal appearing thereacross.

No references cited.

RUDOLPH V. ROLINEC, *Primary Examiner.*
E. E. KUBASIEWICZ, *Assistant Examiner.*